Oct. 12, 1943.  O. R. STRAWN  2,331,580
VALVE MECHANISM FOR JIGS
Original Filed July 19, 1939    4 Sheets-Sheet 1

INVENTOR:
ORVAL R. STRAWN
By Chas. M. Nissen,
ATTY.

Oct. 12, 1943.　　　　O. R. STRAWN　　　　2,331,580
VALVE MECHANISM FOR JIGS
Original Filed July 19, 1939　　　4 Sheets-Sheet 2
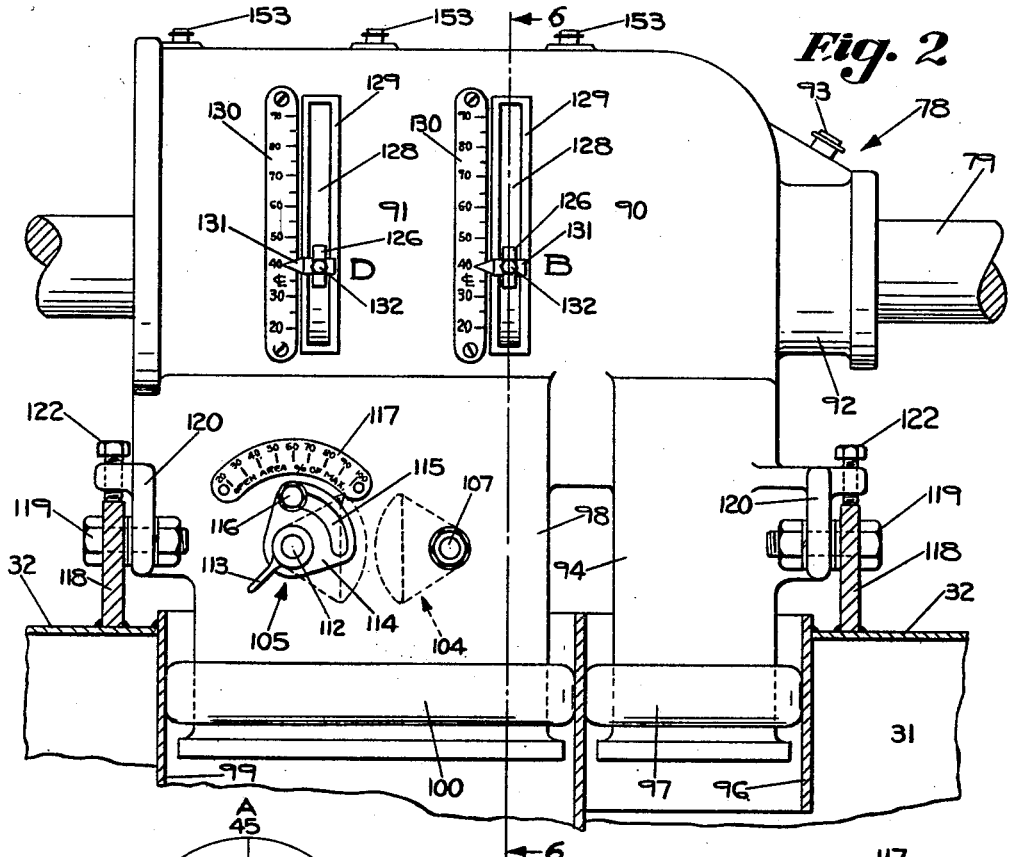
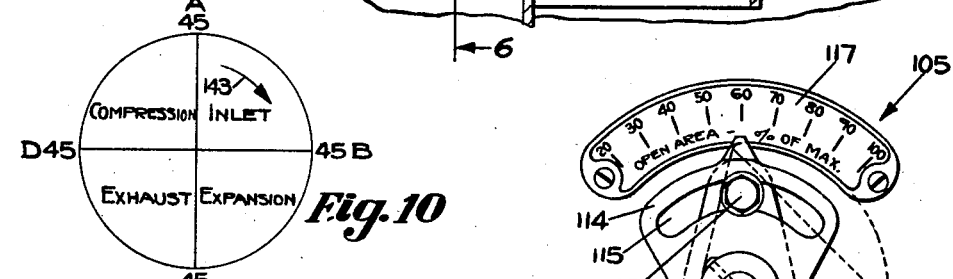
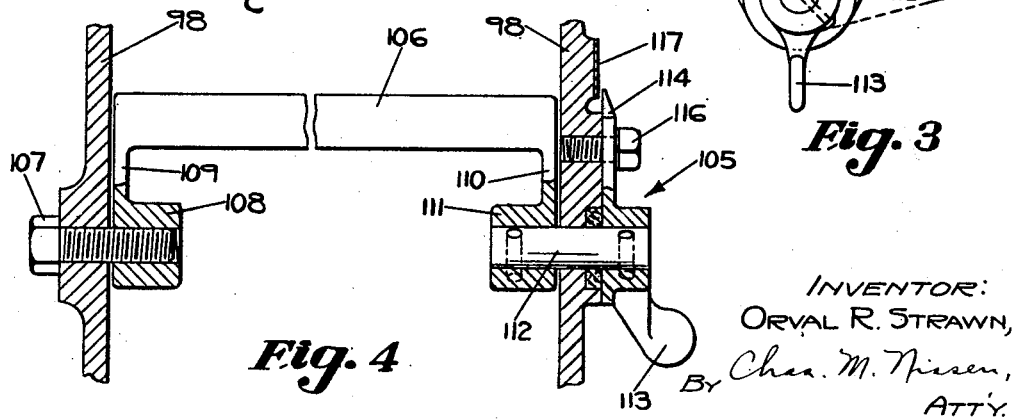
INVENTOR:
ORVAL R. STRAWN,
By Chas. M. Niesen,
ATTY.

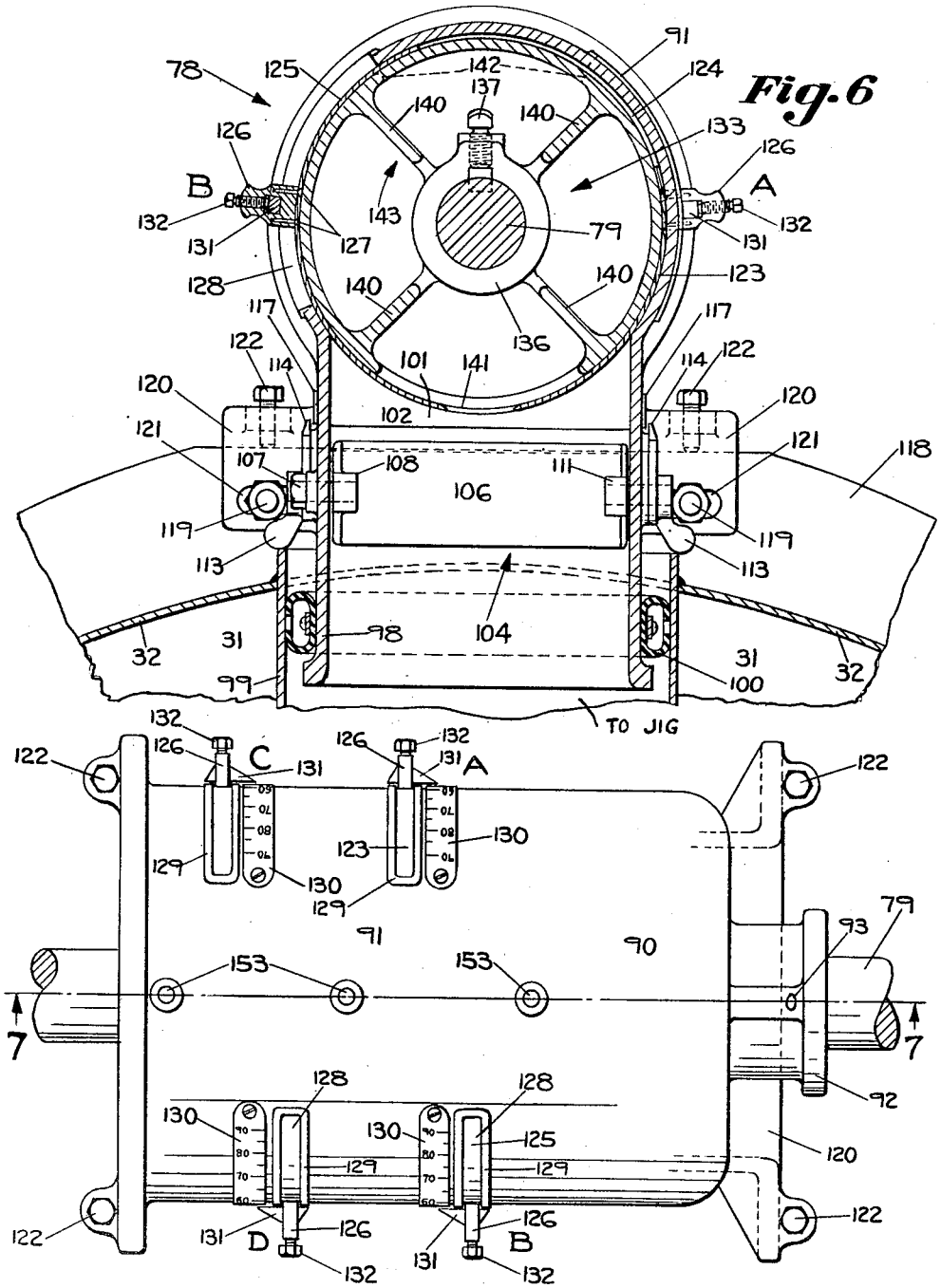

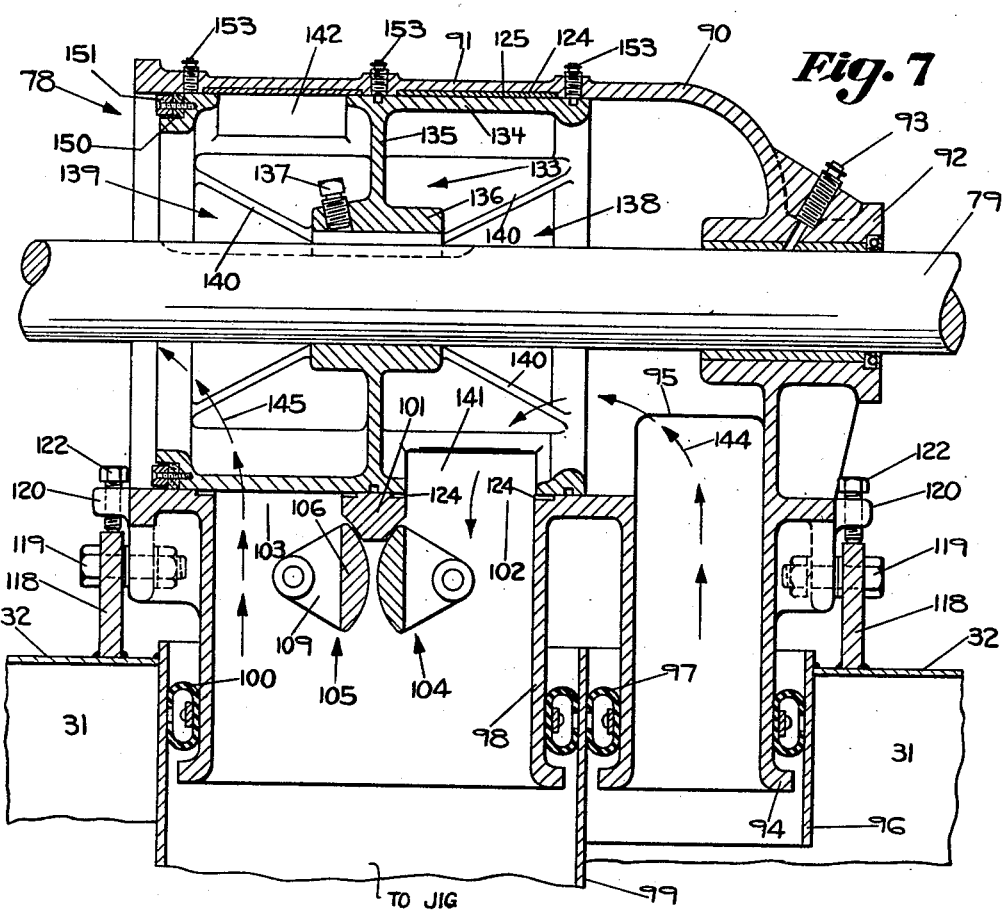
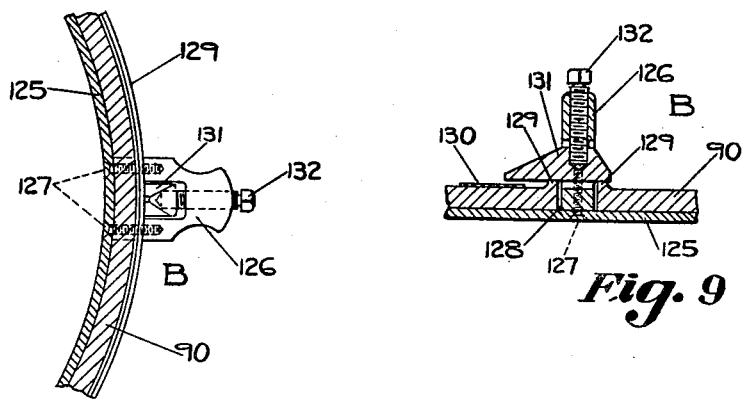

Patented Oct. 12, 1943

2,331,580

UNITED STATES PATENT OFFICE 2,331,580

VALVE MECHANISM FOR JIGS

Orval R. Strawn, Columbus, Ohio, assignor to The Jeffrey Manufacturing Company, a corporation of Ohio Original application July 19, 1939, Serial No. 285,302, now Patent No. 2,281,530, dated April 28, 1942. Divided and this application July 2, 1941, Serial No. 400,821

18 Claims. (Cl. 137—146)

This invention relates to a jig particularly adapted to clean coal and separate refuses found in raw coal from the useable coal.

An object of the invention is to provide an improved compact control valve construction in a Baum type jig.

Another object of the invention is to provide a jig having an improved type of control valve which is readily adjustable, to control the cycle of operation thereof.

A further object of the invention is to provide an improved air control valve particularly adapted for use in a jig.

Other objects of the invention will appear hereinafter, the novel features and combinations being set forth in the appended claims.

In the accompanying drawings,

Fig. 2 is a side elevational view of one of the control valves comprising a feature of the invention;

Fig. 3 is an enlarged view showing control mechanism for an adjusting damper of the valve in Fig. 2;

Fig. 4 is an enlarged sectional view showing an adjustable damper of the valve of Fig. 2;

Fig. 5 is a plan view of the valve of Fig. 2;

Fig. 6 is a sectional view taken on the line 6—6 of Fig. 2 looking in the direction of the arrows;

Fig. 7 is a sectional elevational view of the valve taken on the line 7—7 of Fig. 5 looking in the direction of the arrows;

Figs. 8 and 9 are enlarged sectional views showing details of adjusting means for slide plates of the control valve; and Fig. 10 is a diagrammatical illustration of the four partitions in each cycle of operation of the control valve, by which their manner of adjustment is illustrated.

Figure 1:
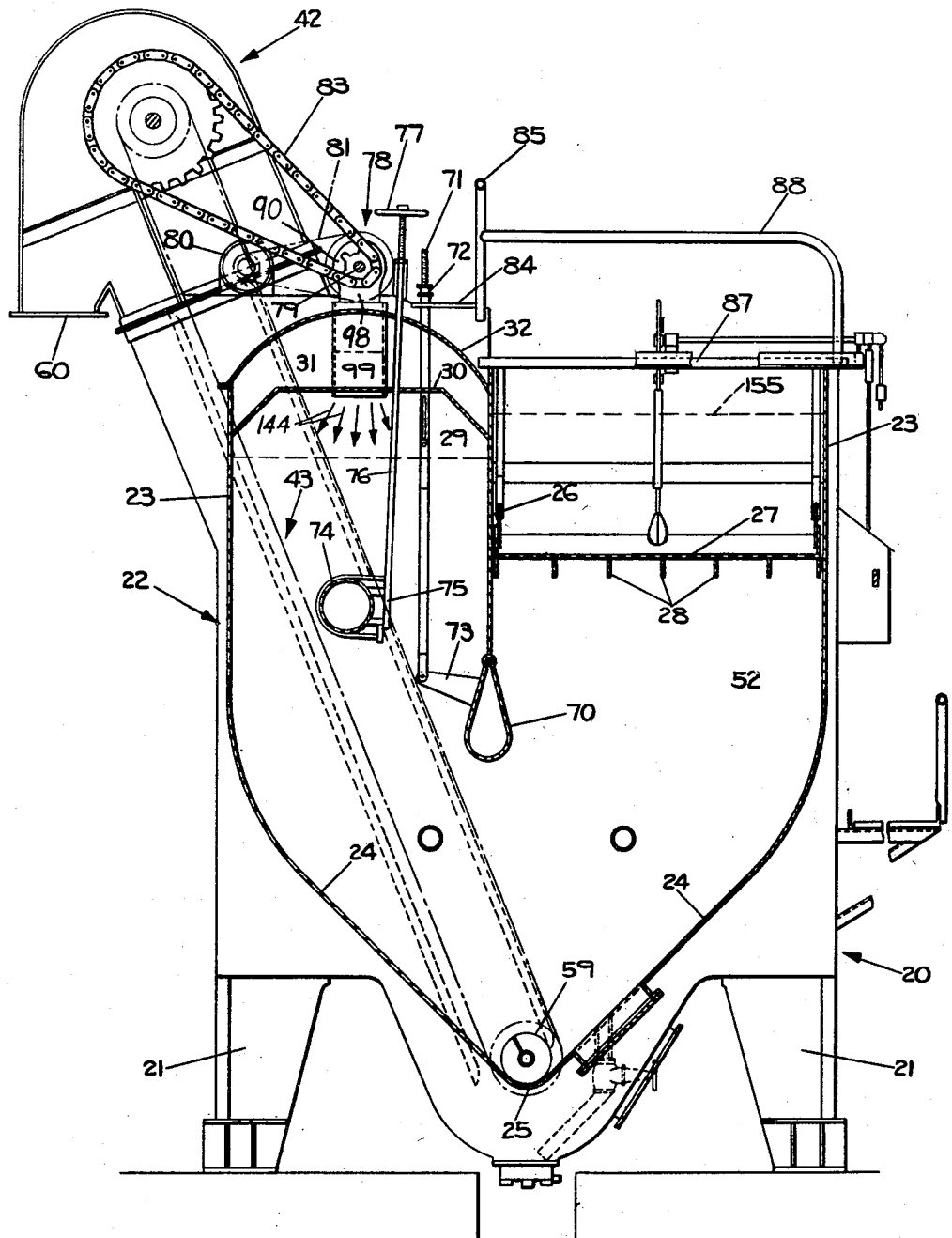
Fig. 1 is a sectional elevational view of a jig embodying my improvements.

This application is filed as a division of my copending application, Serial No. 285,302, filed July 19, 1939, for an improvement in a Jig, which issued as Patent No. 2,281,530, April 28, 1942.

Referring particularly to Fig. 1 of the drawings, it will be seen that I have provided a jig of the Baum type having a main frame 20 provided at its four corners with supporting feet 21 adapted to rest on a floor or other supporting structure of the coal cleaning plant.

Mounted on the main frame 20 is a tank or container 22 which is formed by a pair of longitudinally extending upright side walls 23, which extend the full length of the jig and which have integral converging bottom walls 24, which meet to form a trough 25 in the bottom of the tank or container 22.

Between the upright side walls 23 is a longitudinally and upwardly extending partition 26.

As is well understood, the tank or container 22 receives the water or other jigging liquid and the cross sectional structure thereof, as clearly illustrated in Fig. 1 of the drawings, as well as the liquid, is formed into a U-shaped column in one leg of which, and between partition 26 and one side wall 23, is a perforated plate or screen 27, having a plurality of re-inforcing bars 28 on the bottom thereof. Above the other leg of the water column there is formed an air chamber 29 between the partition 26 and another upright side wall 23, which chamber 29 also is provided by a top plate 30, which top plate 30 also constitutes the bottom plate of a plenum chamber 31 which extends the full length of the jig, the side walls of which are formed by the top of the aforementioned partition 26 and the top of one of the aforementioned side walls 23, and the top of which is formed by a longitudinally extending arched top plate 32. Air under pressure is delivered to plenum chamber 31 from a blower, compressor or the like.

The bottom trough 25 is provided with a screw conveyor 59 which conveys the hutch material into the boot of the associated elevator casing 42, and said hutch material is then elevated by the elevating conveyor 43, by which it is discharged from the discharge opening thereof.

Shown in Fig. 1 is an adjustable flow plate 70, which is pivotally attached at its top to the bottom of the partition 26 and which is adjustable from a position outside the tank 22, by an adjusting rod 71, which is threaded at its upper end and provided with an adjusting nut 72, said rod 71 being pivotally attached to an arm 73, formed rigid with the flow plate 70. The flow plate 70 is preferably in the form of a hollow pear in cross-section or in the form of a streamlined body having a generally tear drop configuration in cross-section to provide a streamlined flow of fluid in the U-shaped water column to provide uniform action over substantially the entire lateral dimension of screen 27. It should be understood that the hollow plate 70 is elongated and forms a downward continuation of the partition 26 between the opposing walls of the compartment in which located.

Water is supplied from a water main 74, by a water control valve 75, provided with an operating shaft 76, operable from the exterior of the tank 22 by a removable hand wheel 77.

Furthermore, associated with the cell 52 is an individual rotary air valve 78, the structure of which is hereinafter described in complete detail and which forms an important feature of the invention. It may be pointed out that the air valve 78 is driven from a drive shaft 79 which is driven from an electric motor 80 by an appropriate chain and sprocket driven mechanism 81. It may further be pointed out that the aforementioned elevating conveyor 43 is also driven from the drive shaft 79 through appropriate chain and sprocket mechanism.

As hereinafter described in full detail, the rotary air valve 78 is very flexible, thereby to adjust the type of stroke provided in the cell 52 of the jig. To provide for ready access to this control valve 78 and to the adjusting means for the water valve 75 and flow plate 70, I provide walks 84 and 87 adjacent to which are handrails 85 and 88.

Attention is now directed particularly to Figs. 1 to 10 inclusive of the drawings, which illustrate the detailed structure of the rotary air valve 78 and the adjustable cycle of operation provided thereby.

Said rotary air valve 78 comprises a casing or housing 90, which has a generally cylindrical shaped portion 91 and has an exhaust or outlet opening at the left hand end as viewed in Fig. 7 and at the other end has a head carrying a journal bearing 92, which supports the driven shaft 79, said journal bearing 92 being provided with an appropriate grease fitting 93. From said head end of the casing 90 there projects a downwardly extending integrally formed air inlet conduit 94, which communicates with the interior of said casing 90 by way of air feed inlet opening 95. As may be seen by reference to Figs. 2 and 7 of the drawings, the conduit 94 is slidably received by a short pipe 96, which extends into and has open communication with the aforedescribed plenum chamber 31. An air-proof packing in the form of a tubular rubber ring 97 is attached to the inlet conduit 94 and presses against the interior walls of the pipe 96 to provide a fluid-tight sliding connection. It is evident particularly, by reference to Fig. 7 of the drawings, that an air inlet passageway is provided from the interior of the plenum chamber 31 to the interior of the casing 90 of the rotary air valve 78 by way of pipe 96, conduit 94 and air feed inlet opening 95, which passageway is open at all times.

The casing or housing 90 is also provided with an integral downwardly extending main air passage conduit 98 which extends into a downwardly extending pipe 99 which, as clearly seen by reference to Fig. 1 of the drawings, extends entirely through the plenum chamber 31 and has its bottom opening into the air chamber 29. There is a packing 100, similar to the aforedescribed packing 97, which is attached to the conduit 98 and makes a sliding air-tight connection with the pipe 99. By reference particularly to Fig. 7 of the drawings it will be seen that at the top of the main conduit 98 there is a central web 101, which forms an inlet port 102 and an exhaust or outlet port 103 in the top of the conduit 98 or adjacent the bottom of the cylindrical part of casing 90.

The circumferential portion of the complete circle of the cylinder 91 which is subtended by the ports 102 and 103, as illustrated in Fig. 7 of the drawings, is a matter of considerable importance; that is, each of the ports 102 and 103 subtends a portion of the arc of a circle which describes the interior of the cylinder 91. In the valve here described, this is an angle of 110 degrees of the 360 degrees representing the complete circle. It is to be distinctly understood, however, that this angle may be made anything desired up to the theoretically maximum value of 180 degrees; and as hereinafter described, the effective size of this port 102 in degrees is adjustable between zero and the maximum provided by the structure which, in the illustrated case is 110 degrees. As previously mentioned, the ports 102 and 103 both subtend angles of 110 degrees, although if desired they may be made to subtend the maximum angle or any other desired angle.

Associated with the inlet port 102 is an adjustable damper 104, which may be adjusted to vary the effective size of opening thereof and a similar damper 105 is provided in association with the exhaust or outlet port 103. These dampers 104 and 105 are of similar construction except that their control mechanisms are on opposite sides of the main conduit 98, as clearly illustrated in Fig. 6 of the drawings.

The damper 105 will be described in detail and it is to be understood that the description also applies to the damper 104, except for the revision above mentioned.

Said damper 105 comprises an arcuate valve member 106 which is pivotally attached to opposite walls of the conduit 98 by a pivot bolt 107 which extends freely through one wall of said conduit 98 and is threaded to a boss 108 formed on an arm 109, both of which are integral with said valve member 106, as shown in Fig. 4.

At the opposite end, valve member 106 is provided with an arm 110 carrying a boss 111 (Fig. 4) which is keyed to a pivot shaft 112 journaled in the opposite wall of conduit 98 and is keyed to an operating handle 113 carrying an integral pointer 114 in the form of a segment of a disc having an elongated slot 115 therein through which extends a clamp screw 116. Pointer 114 is associated with a scale 117 carried on the exterior of the conduit 98 which indicates the percentage of maximum opening provided by the position of the damper 105 in any position to which it is adjusted. The screw 116 of course provides for locking said damper 105 in any position to which it is adjusted.

To support the complete rotary air valve 78 in position, it is to be noted that extending transversely of the top plate 32 of the plenum chamber 31 is a pair of spaced upright supports 118 (see Figs. 2, 6 and 7) provided with appropriate bolt holes through which extend four bolts 119 adapted to be attached to four brackets 120, two of which are formed integral with the conduit 94 and two of which are formed integral with the conduit 98. The brackets 120 are provided with elongated horizontally extending slots 121 (see Fig. 6) which receive the bolts 119 and thus provide for lateral adjustment of the valve 78 with respect to the pipes 96 and 99. Vertical adjustment of the rotary air valve 78 with respect to pipes 96 and 99 is provided by set screws 122, of which there is one associated with each of the brackets 120, which are adapted to bear on the tops of the plates 118. This of course provides for ready adjustment both vertically and laterally of opposite ends of the rotary air valve 78.

As was above pointed out, and as seen by reference to Fig. 6 of the drawings, the inlet port 102 and the exhaust port 103 subtend arcs which in the particular valve illustrated are each equal to 110 degrees, the angle between the upper ends of the opposite side walls of the conduit 98. The effective size of each of these ports is preferably adjustable from zero to the maximum value of 110 degrees, and to provide for this adjustment, together with indicating means, the cylindrical portion 91 of the casing 90 is provided with two pairs of adjustable arcuate slide valves or slide plates, one of each pair being on opposite sides thereof, which, as seen by reference to Fig. 5 of the drawings, are designated generally by the letters A, B, C and D. The slide valves A and B are associated with the inlet port 102 and control its effective size, and the slide valves C and D are associated with the exhaust or outlet port 103 and control its effective size.

By referring particularly to Figs. 6 and 7 of the drawings it will be seen that the slide valve A comprises an arcuate plate 123 which fits in an arcuate groove 124 (see Fig. 7) formed in the interior of the cylinder 91. Plate 123 extends over an arc of approximately 80 degrees. The adjustable slide valve B is of similar construction and generally oppositely positioned with respect to slide valve A and it comprises an arcuate plate 125 which fits in the arcuate groove 124 formed in the interior of the cylinder 91. Plate 125 extends over an arc of approximately 170 degrees.

As clearly seen by reference to Figs. 6, 8 and 9 of the drawings, approximately midway of the arc of the plate 125 there is an operating handle 126 which is rigidly attached thereto by screws 127, and which is adapted to slide in an elongated arcuate slot 128 formed in the cylinder 91. Adjacent the lateral edges of the slot 128 said cylinder 91 is embossed as seen at 129 (see Fig. 9). Adjacent one side of the slot 128 is an indicating scale 130. A combination pointer and clamping member 131 extends through a transverse notch in the handle 126 and has a point adjacent the scale 130. The handle 126 is clamped in any position to which it is adjusted by the cooperation of the clamp member 131 and a set screw 132 threaded in the handle 126 and extending loosely into a receiving pocket in said clamp member 131. It is evident that by screwing down the set screw 132 the plate 125 will be clamped in adjusted position by the bearing of the clamping member 131 on the embossment 129.

It may be stated that a structure similar to that above described in connection with slide valve B is also provided in connection with each of the slide valves A, C and D. However, it is to be noted, as above pointed out, that the arcuate plate 123 associated with the valve A extends only over an arc of 80 degrees and the handle associated therewith is preferably attached to the topmost portion of said plate 123, as illustrated in Fig. 6 of the drawings. The slide valve C is identical in structure to the slide valve A and the slide valve D is identical in structure to the slide valve B.

By reference to Fig. 6 of the drawings the importance of the positions of the slide plates 123 and 125 will be evident. As was above pointed out, the arcuate extent of the inlet port 102 is 110 degrees. The extent of the plate 125 is 170 degrees and the extent of the plate 123 is 80 degrees. This of course makes a total of 360 degrees and thus permits the two plates 123 and 125 to be adjusted alternately. When the upper ends of the two slide plates 123, 125 are in contacting relation the inlet port 102 is in its wide open position. If the inlet port 102 extends over an angle in excess of 110 degrees an appropriate reduction must be made in the arcuate extent of the plate 123 or of the plate 125.

It is also evident from reference to Fig. 6 of the drawings that by adjusting the slide valves A and B the lower edges of the plates 123 and 125 may be brought toward each other thereby providing for an adjustable variation in the effective size of inlet port 102 from the maximum value, which is 110 degrees in the illustrated embodiment of the invention, to a minimum value of substantially zero. This of course makes for a very flexible adjustment of the effective size of the inlet port 102.

In Fig. 6 the upper ends of the arcuate slide plates 123 and 125 are 90° apart and the lower ends of these plates are 20° apart. The 80° of the plate 123 and the 170° of the plate 125 when added to said 90° and 20° total 360°. When the plates 123 and 125 are both moved up 45° from their positions shown in Fig. 6 until their upper ends are in contact, the lower ends of these plates will be 110° apart and there positioned beyond the left-hand and right-hand edges of the air inlet port 141. This is equal to the subtended angle of the inlet port 102 which is in communication with the main conduit 98 that leads to the chamber 29 shown in Fig. 1. The air inlet port 141 has an angle of 70° but when the lower ends of the plates 123 and 125 are 110° apart as viewed in Fig. 6, and the rotor is rotated while the plates 123 and 125 are stationary, the compressed air from the inlet conduit 94 of the housing 90 from the point it begins to pass through the inlet port 141 until the point where this air passage is cut off requires 180° of rotation of the rotor.

This can be seen by referring to Fig. 6 and considering the lower ends of the slide plates positioned right and left beyond the edges of the inlet port 141. Then as the rotor rotates with the left-hand edge of the inlet port 141 in a position above the right-hand wall of the conduit 98, the compressed air flows into the inlet port 102 not only through an angle of 110° of movement of the left-hand edge of the inlet port 141 but also through an additional angle of 70°, the angular opening of the inlet port 141, because the air passageway is not cut off until the right-hand edge of the inlet port 141 is above the left-hand wall of the conduit 98.

Now when the slide plates 123 and 125 are moved beyond the edges of the inlet port 141 the conditions are somewhat different. For instance, when the lower ends of these plates are 20° apart and secured to the housing 90 in stationary positions, the rotation of the rotor does not open the passageway to the inlet port 102 until the left-hand edge of the inlet port 141 passes the lower end of the plate 123 and when the right-hand edge of the inlet port 141 reaches the lower end of the plate 125 the said passageway will be closed. There is therefore an angular movement of 70° plus 20° which totals 90° of movement of the rotor for passage of compressed air from the inlet port 94 to the main inlet port 102 of the main conduit 98. Consequently, when the lower ends of the plates 123 and 125 extend to the right and left beyond the inner edges of the inlet port 141 the compressed air passage to the main conduit 98 will occur during a rotation of the rotor of 70° plus the effective angular opening between the stationary lower ends of the plates 123 and 125.

As was above pointed out, a similar structure is provided in association with the exhaust or outlet port 103, provided by the two slide valves C and D, which make for the same range of adjustment as above described.

It may be pointed out that the rotary air valve 78 is normally adjusted in operation so as to carry out the method of jigging described in the patent to Byron M. Bird, No. 2,132,376 dated October 11, 1938, for a method of jigging. As there pointed out, the jigging cycle includes four periods of air control comprising the air inlet period, during which air flows into the chamber 29, an expansion period during which the chamber 29 is sealed and the air therein expands, an exhaust period, during which the air is free to flow from the chamber 29 to atmosphere, and a compression period during which the air in chamber 29 is again sealed and compressed by the upward movement of the jigging liquid into said chamber 29. The compression and expansion periods may be considered periods of isolation particularly with reference to the main conduit 98 since it is then isolated against air inflow or exhaust.

To provide these four steps or periods in the cycle of operation of the rotary air valve 78, the latter also includes a rotor 133 which has an outer cylindrical surface 134. The rotor is adapted to rotate in the aforementioned cylinder 91 and is provided with open ends forming an air inlet opening at the right and an air exhaust or outlet opening at the left, as viewed in Fig. 7, which openings are always in communication with the aforedescribed air feed inlet opening 95 and the casing air exhaust or outlet opening, respectively. Said rotor 133 also has a central radially extending partition 135, which divides the cylinder 134 into two compartments, said partition 135 being provided with an integral hub 136 which is keyed to the shaft 79 and provided with a key retaining set screw 137. The partition 135 divides the rotor into an air inlet control portion 138, seen at the right hand side of the partition in Fig. 7 of the drawings, and an air outlet control portion 139, seen at the left of said partition 135. In addition, the rotor 133 includes radial webs 140 which extend from the hub 136 to the cylinder 134. The air inlet control portion 138 of the rotor 133 is provided with an air inlet control port 141 which may subtend an arc of any desired size, and in the embodiment of the invention illustrated in Fig. 6 this arc is approximately 70 degrees. The air outlet control portion 139 of the rotor 133 is also provided with an air outlet control port 142 which is preferably of the same circumferential extent as the port 141. The center lines of the arcuate ports 141 and 142 are preferably 180 degrees apart, or in other words, are diametrically opposite, as clearly illustrated by Figs. 6 and 7 of the drawings.

To illustrate one representative cycle of operation for the cell 52 (Fig. 1) of the jig under the control of the rotary air valve 78 attention is now directed to Fig. 10 of the drawings. The cycle of operation there represented is one in which all of the adjustable arcuate slide valves A, B, C and D are set with their pointers to read 45 degrees on the aforesaid scales 130. Assuming the rotor 133 to be rotating in a clockwise direction, as indicated by the arrow 143, in Figs. 6 and 10, it will be seen that an air inlet period of 90 degrees is provided between the characters A and B which may represent diagrammatically the handles A and B. In other words, the slide valves A and B are adjusted so that the sum of the two readings on the scales 130, associated with them is equal to 90 degrees, and in the illustration given each is set at 45 degrees.

It may be stated that under these conditions the effective size of the inlet port 102 is reduced from the maximum value of 110 degrees to 20 degrees, whereby the air inlet period will be equal to the size of air inlet control port 141 in degrees, which is 70, plus the effective size of air inlet port 102, which is 20, making a total of 90 degrees. This is because of the fact that the air inlet period will begin as soon as the forward edge of air inlet control port 141 clears the forward edge of the plate 123 in the direction of rotation of said rotor 133, whereby compressed air will flow from the plenum chamber 31 (see Fig. 7) along a passageway provided by way of pipe 96, conduit 94, air inlet opening 95, open end of rotor 133, air inlet control port 141, inlet port 102, conduit 98 and pipe 99 into the air chamber 29, as indicated by the arrows 144. When the trailing edge of the air inlet port 141 has overlapped the bottom edge of the plate 125 the expansion period will begin and this will continue until the leading edge of the air outlet control port 142 clears the lower or leading edge of the plate of valve C similar to the plate 123 of valve A, which of course terminates the expansion period and starts the exhaust period during which air in the chamber 29 will flow along a passageway over the obvious path indicated by the arrows 145 (Fig. 7 of the drawings) to atmosphere since outlet control port 142 now communicates with exhaust port 103. The exhaust period ends and the compression period starts when the trailing edge of the air outlet port 142 first overlaps the plate associated with valve D, which is similar to the plate 125 of valve B. This period lasts until the cycle starts anew with the air inlet period.

It is evident that the reference characters A, B, C, and D on Fig. 10 of the drawings may represent the slide valves A, B, C, and D. It is thus evident that by adjusting any one or more of said slide valves A, B, C and D, the sizes of the inlet, expansion, exhaust and compression periods may be adjusted, and due to the fact that any one of the radial lines A, B, C and D of Fig. 10 may be adjusted in a clockwise or a counter clockwise direction, an extremely flexible control valve is provided so that the relative portions of a complete cycle, as represented by inlet, expansion, exhaust and compression periods may be widely adjusted.

It is to be particularly noted that one of the important features of the control valves of the jig of the invention is that the expansion and compression periods do not have to be the same, as they do in the valve described in the aforementioned Bird patent. As a matter of fact, the only limitations as to the sizes of the various periods is as follows:

With the valve above described the minimum value of inlet and exhaust periods is 70 degrees and this is because the size of the air inlet control port 141 is 70 degrees. If the size of the air inlet port 141 is other than 70 degrees, the minimum inlet and exhaust periods will vary accordingly. Another limitation is that the maximum value of the air inlet and air exhaust periods is 180 degrees and this is because the sum of the angles subtended by ports 141 and 142 on the one hand and the angles of the inlet and exhaust ports 102 and 103 on the other hand is 180 degrees. In other words, air inlet port 141 is 70 degrees and inlet port 102 is 110 degrees and the sum is 180 degrees. Likewise, air outlet port 142 is 70 degrees and exhaust port 103 is 110 degrees, and the sum is also 180 degrees. Any adjustment in any of these ports provides a corresponding variation of this maximum value.

Furthermore, it is to be clearly understood that no two of the four periods of inlet, expansion, exhaust and compression need be of the same value, and furthermore, the phase relation between them can be widely adjusted.

It may be pointed out that to determine the value of the inlet period the scale readings associated with valves A and B are added together. To determine the value of the exhaust period the readings of the scales associated with valves C and D are added together. To determine the expansion period the readings of the scales associated with valves B and C are added together and this total is subtracted from 180. To determine the compression period the readings of the scales associated with valves D and A are added together and this total is subtracted from 180.

It may be noted, by reference particularly to Fig. 2 of the drawings, that between the readings 30 and 40 on scales 130 is a center line marking and whenever the pointer 131 is at this position the bottom edge of the associated plate 123 or 125 is at a position directly below the axis of shaft 79. It is thus evident, of course, that if any two cooperating valves, such as valves A and B are both placed at this center line position, the associated inlet or exhaust port, such as inlet port 102, will be substantially completely closed and, of course, this condition should be avoided. It is also evident that it is impossible to place two cooperating valves with their indicators both below this center line position because this would require an impossible overlapping of the plates 123 and 125, or their equivalents. It is furthermore to be noted that not only is it possible to adjust the slide valves A, B, C and D to obtain variable amounts of inlet, expansion, exhaust and compression periods but it is also possible to eliminate entirely the compression and expansion periods, thus retaining only inlet and exhaust periods.

It may also be noted, as seen in Fig. 7, that an air seal is provided by washer 150 and compression ring 151 attached to rotor 133 by counter-sunk screws. Lubrication fittings 153 are also carried by cylinder 91 for lubricating rotor 133.

In the operation of the jig, the raw coal to be treated to remove the impurities therefrom, is fed onto the screen 27. In the operation of the jig there are two types of water flow which are controlled. Water pulsations, forming the jig stroke under the control of the rotary valve 78 should act uniformly on all parts of the bed of material on the screen 27. Chamber 29 is provided with a rotary valve 78 and partition 26 is provided with an adjustable flow plate 70 at its bottom under which the water moves to the screen compartment. The adjustment of this flow plate 70 diverts the water to different parts of the screen compartment, as may be required for uniform action. Furthermore, the rotary valve 78 is provided with means for adjusting each period of inlet, expansion, exhaust and compression, and therefore the expansion and compression may be adjusted for different periods.

It will therefore be seen that in the cell 52 the successive periods of air inlet, expansion, exhaust and compression successively follow during which compressed air is successively allowed to flow into the chamber 29 and cause an upward movement of liquid through the screen 27 which continues during the expansion period.

On further rotation of the shaft 79 of Fig. 7, the port 142 communicates with the conduit 98 and thereupon the air is exhausted from chamber 29 to permit the water in the U-shaped cell 52 (Fig. 1) to flow downwardly through the screen 27. Before this downward flow is completed the port 142 is cut off and finally the cycle is completed with the compression period during which the chamber 29 is sealed and the air therein compressed by the water flowing downwardly through the screen 27. The cell 52 is provided with the controlling valve structure shown in Fig. 7 so that the expansion and compression periods for this cell may be different from any other cell of a series of successive cells and also from the expansion and compression periods of each of the other cells. In other words, the expansion period of each cell of a series and the compression period of each cell may be individually adjustable for the purpose of securing such adaptation to the bed of material being treated as will secure greater efficiency.

With the differential stroke, that is, with the expansion and compression adjusted for different periods, the upward or pulsion movement of the water through the screen 27 first causes the top of the bed to expand which is immediately followed by expansion of the entire bed so that settlement starts from the bottom of the expanded bed and enables the refuse to immediately settle to the bottom. In other words, with the differential stroke or the expansion and compression adjusted for different periods, the entire bed is opened up by the upward pulsion movement, and stratification is free to take place throughout the entire expanded bed of material. Consequently during the expansion period the heaviest particles, having settled to the bottom or directly on the screen, will prevent the fines from reaching the screen and passing through the same into the hutch. Without the differential stroke or difference in the expansion and compression periods, the upward or pulsion stroke tends to lift the bed "en masse" and settling takes place only from the bottom of the bed and this permits the finer pieces to work down closer to the screen openings with the result that the hutch product as well as the tendency to clog the screen are increased. Furthermore the effect of a jig bed without the differential stroke is to leave the top layer still tight and with the heavy impurities still imbedded therein even after compression occurs.

Circulation water, pumped to the jig and passing through it, forms the conveying element in the jig. This flowing water moves the coal from one cell to the next cell of a series of cells and thence to an outlet chute. Adjustment of this incoming water also effects the jig pulsations and is obtained by the valves 75 one of which may be provided for each of the cells.

The adjustments effected at A, B, C, D, Fig. 5, enable utilization of different velocities of water movement during the various phases of the jig stroke for each cell. These differential velocities are under the operator's control. The potential problems of coal size, volume and washability are met by making such adjustments. Adjustments of expansion and compression for different periods or providing the controlled differential stroke, enables the jig to initially open the jig bed from the top instead of the bottom, permitting deeper beds and higher capacities. In other words, by independently adjusting the expansion and independently adjusting the compression, each may be widely varied to suit conditions of operation on the material being treated, thus increasing the efficiency of operation.

It should also be noted that by having the coal and refuse in all cells move in the same direction toward their respective refuse ejectors, assures a more uniform separation of the fine materials. The smooth, rhythmic action secured by independently controlled successive cells, is not disturbed by eddies because the coal and refuse in both compartments move in the same direction toward their respective outlets.

It should also be noted that by means of the set screws 122 (Fig. 7) each rotary air valve 78 may be tilted for co-operation with the bolts 119 along the slots 121 (Fig. 6) to secure alinement of other rotary air valves 78 in a series since they should all be mounted for rotation by the same shaft 79.

It is, of course, evident that the valves 78 in a series may not only be individually adjusted to determine the relative periods of inlet, exhaust, expansion and compression, but also the control provided by the dampers 104 and 105 provides for a further controlling of the action of each of said valves and this extremely flexible control makes possible a wide variation in the shape of the time-velocity curve of water movement to provide the desired jigging action. This jigging action, of course, is effective to stratify the bed of material on the screen 27 with the high gravity refuse such as pyrite and shale in the bottom stratum, above which will be the intermediate gravity material such as bony coal and possibly some shale, with clean coal at the very top.

It may be pointed out that in general the treatment to be given the material in one cell is different from that desired in the next cell due to the difference in the specific gravity of refuse which is to be removed and consequently there will be a different valve setting for the valves 78 associated with each cell from that of the valves 78 associated with the other cells in a series.

It will therefore be evident that I have provided a jig which is unusually flexible and which can provide any desired shape of time velocity curve of water movement through the several material supporting screens of a series of cells, to effect the most efficient treating action on the material introduced. The time-velocity curve can be readily adjusted even while the jig is in operation, making it possible for the operator to adjust the jig and test the results so that the most efficient treatment is given to the particular material being treated, it being well known that various materials such as coal found in different mines and in different parts of the country require different treatments to effect an efficient separation of the refuse from the clean coal.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a device of the character described, the combination with a casing having a cylindrical interior with an air inlet opening at one end and an air exhaust opening at the other end and with a main conduit intermediate the ends of the casing, of a rotor having a radial partition dividing it into air inlet and air outlet control portions, said rotor being provided with valve ports spaced 180° apart on opposite sides of said partition, arcuate devices adjustable relative to said casing, two such devices being associated with each of said valve ports, and means for rotating said rotor to effect intermittent passageways between the casing inlet opening and the main conduit and between the latter and said casing exhaust opening.

2. In a device of the character described, the combination with a casing having an inlet opening and an exhaust opening with a main conduit extending from said casing, of a rotor having means including valve ports on opposite sides of a transverse partition arranged respectively to be in communication with the inlet opening and the exhaust opening, and four devices two associated with each port for independently adjusting the opening and closing of said ports on opposite sides of the partition, and means for rotating said rotor to intermittently establish a passageway from the casing inlet opening to said main conduit and a passageway from the latter to the casing exhaust opening.

3. In a device of the character described, the combination with a housing having an inlet opening, of a main conduit connected to said housing and having an arcuate port of 110°, slide valves adjustably mounted on said housing and associated with said main conduit port for a spreading apart from zero to 110°, and a rotor having a 70° port in communication with said inlet opening and for co-operation with said 110° port to control passage of air from the inlet opening in the housing to said main conduit during rotation of said rotor through angles varying from zero as a minimum to 180° as a maximum.

4. In a device of the character described, the combination with a housing having an inlet opening and an exhaust opening, of a rotor mounted in said housing and provided on opposite sides of a partition with 70° ports on opposite sides of the rotor and arranged to communicate respectively with the inlet and outlet openings, a main conduit communicating with said housing and having a port of 110° as subtended by said rotor, and four adjustable slide plates two for each of the ports in the valve for varying the passageways into and out of said conduit during rotation of said valve through angles varying from zero as a minimum to 180° as a maximum.

5. In a device of the character described, the combination with a housing having inlet and outlet openings, of a main conduit connected to said housing intermediate said openings, a rotor having ports therein, a partition separating said ports, slides for controlling passageways through said housing and rotor, one passageway being from said inlet opening through one port in said rotor to said main conduit and another passageway being from the main conduit through the other port in said rotor to the outlet opening in said housing, means comprising angle designated scales associated with pointers attached to said slides for indicating the angular positions of the latter relative to said housing, two slides being provided for each rotor port and a separate scale being provided for each slide, and means for rotating the rotor while the slides remain stationary.

6. In a device of the character described, the combination with a housing having spaced inlet and exhaust openings and controllable inlet and outlet ports, of a main conduit connected to said housing and communicating with said ports, a generally cylindrical rotor having inlet and outlet ports in the cylinder wall thereof adapted to communicate successively one with each of said housing ports upon rotation of said rotor and having inlet and exhaust openings permanently communicating with said housing inlet and exhaust openings respectively, a separating partition between said rotor ports, four slides for controlling passageways through said housing, one passageway from said inlet openings through the inlet ports in said housing and rotor to said main conduit and the other passageway being from the main conduit through the outlet ports in said rotor and housing to the exhaust openings in said housing and rotor, means comprising angle designated scales associated with pointers attached to said slides for indicating the angular positions of the latter relative to said housing, the designations on the scales including center lines to indicate the limits toward closing positions of said slides, two slides being provided for each valve rotor port and a separate pointer being provided for each slide, and means for rotating the rotor while the slides remain stationary.

7. An air valve of the class described comprising the combination with a housing having an air inlet and an air outlet and having a main conduit for connection to an air chamber, said main conduit having an air inlet port and an air exhaust port, of a rotor mounted for continuous rotation within said housing and having a dividing partition extending transversely of its axis of rotation, said rotor being open at its ends to provide for communication of said air inlet and air outlet of the housing respectively with the rotor on opposite sides of said partition, an air inlet port in the periphery of said rotor on one side of said partition and an air outlet port in the periphery of said rotor on the other side of said partition, said ports in the periphery of said rotor being adapted to register successively with the main conduit, two separate slide valve means associated with the openings in the periphery of said rotor for adjusting the periods during each cycle of rotation of said rotor that an air inlet passageway is completed to said air chamber, an air discharge passageway is completed therefrom, and two periods during which neither passageway is provided.

8. An air valve of the class described comprising the combination with a housing having a main conduit for connection to an air chamber, said housing having an air inlet and an outlet, of a rotor mounted for continuous rotation within said housing and provided with a dividing partition extending transversely of its axis of rotation, said rotor having one end open to said air inlet of said housing and the other end open to said air outlet of said housing, an air inlet port in said rotor on one side of said partition and an air outlet port in said rotor on the other side thereof, said air inlet port and said air outlet port being adapted to register successively with said main conduit, and two separate slide valve means one associated with the air inlet port in said rotor and the other associated with the air outlet port in said rotor, for adjusting the periods during each cycle of rotation of said rotor for air inlet and air outlet to be completed to and from said main conduit and for adjusting the periods during each such cycle for isolation of said main conduit, the construction and arrangement being such that the inlet period shall be followed by an isolation period, that said isolation period shall be followed by the outlet period from said main conduit and that before the next inlet period there shall be another isolation period.

9. An air valve of the class described comprising the combination with a housing having a main conduit for connection intermediate its ends to an air chamber, one end of said housing having an air inlet opening and the other end having an air outlet opening, of a rotor mounted for continuous rotation within said housing and having a dividing partition extending transversely of its axis of rotation, one end of said rotor being in open communication with the air inlet opening of said housing and the other end of said rotor being in open communication with the air outlet opening of said housing, an air inlet port in said rotor on one side of said partition offset with respect to an outlet port in said rotor on the other side of said partition, said inlet and outlet ports in the rotor being adapted to register successively with said main conduit during each rotation of the rotor, and two separate slide valves each adjustable circumferentially of said rotor to adjust said inlet and outlet ports therein and thereby adjust the periods of inlet passage, outlet passageway and closure relative to said air chamber.

10. An air valve of the class described comprising the combination with a housing having a main conduit for connection to an air chamber, said housing having an air inlet opening and an exhaust opening, of a rotor mounted for continuous rotation within said housing and having a closed dividing partition extending transversely of its axis of rotation, one end of said rotor having an opening to receive air from the inlet opening of said housing and the other end of said rotor having an opening to exhaust air to the outlet opening of said housing, an air inlet port in the periphery of said rotor on one side of said partition offset with respect to an outlet port in the periphery of said rotor on the other side of said partition, and two separate slide valve means associated with the ports in the rotor, each valve means having two slides movable toward and from each other to adjust the size and angular position of the opening between them and thereby control during rotation of said rotor the cycle of air inlet to said air chamber, the confining of the air therein, the air outlet from the said air chamber and the confining of the air again therein before the beginning of another cycle upon the next rotation of said rotor.

11. A valve of the class described comprising the combination with a casing having inlet and exhaust openings and intermediate inlet and exhaust ports leading to and from a main conduit, of a rotor mounted for continuous rotation in said casing, means comprising ports in said rotor for directing air from the inlet opening of said casing through the intermediate inlet port into said main conduit and from the latter through the intermediate exhaust port to the exhaust opening of said casing, and a plurality of arcuate plates shiftable with respect to said casing to adjust the effective sizes of said intermediate ports.

12. In a device of the class described, the combination with a casing having an inlet opening at one end and an air outlet opening at the other end with inlet and outlet ports intermediate the ends of said casing, of a main conduit for connection to an air chamber from said intermediate inlet port, the exhaust from such air chamber being through said main conduit and said intermediate outlet port and end outlet openings, adjustable dampers adjacent said intermediate inlet and outlet ports, a rotor having a radial partition dividing it into air inlet and air outlet control portions, said rotor having valve ports spaced apart on opposite sides of said partition, one valve port in said rotor being an inlet port adapted to register with the intermediate casing inlet port and the other valve port being an outlet port adapted to register with the intermediate casing outlet port, and means for rotating said rotor to secure a predetermined cycle of operations in the air chamber including inlet of compressed air to said main conduit on one side of said partition and exhaust of air from said main conduit on the other side of said partition.

13. A rotary air valve including a casing having an air inlet opening and an air exhaust opening, a rotor arranged to rotate therein, said rotor having a radial partition dividing it into air inlet and air outlet control portions, air control ports in the rotor wall, one on each side of said partition and spaced substantially 180 degrees apart, said casing having a main air passage conduit communicating with the interior of said casing by spaced inlet and exhaust ports each adapted to register with one of said air control casing ports during a period when said rotor rotates, an air inlet opening in said rotor on one side of said partition and an air exhaust opening leading from the interior of said rotor on the other side of said partition, whereby as said rotor is rotated air inlet and exhaust passageways will be successively provided from said casing air inlet opening through said rotor to said main air passage conduit and from the latter through said rotor to said casing air exhaust opening, slide valves adjustable with respect to said casing, two associated with each of said casing inlet and exhaust ports, and means for adjusting said slide valves to adjust the proportion of each cycle of operation of said rotor that said air inlet and exhaust passageways are provided.

14. A rotary air valve including a casing having an air inlet opening and an air exhaust opening, a rotor arranged to rotate therein, said rotor having a radial partition dividing it into air inlet and air outlet control portions, air control ports in the rotor wall, one on each side of said partition and spaced substantially 180 degrees apart, said casing having a main air passage conduit communicating with the interior of said casing by spaced inlet and exhaust ports each adapted to register with one of said air control casing ports during a period when said rotor rotates, an air inlet opening in said rotor on one side of said partition and an air exhaust opening leading from the interior of said rotor on the other side of said partition, whereby as said rotor is rotated air inlet and exhaust passageways will be successively provided from said casing air inlet opening through said rotor to said main air passage conduit and from the latter through said rotor to said casing air exhaust opening, slide valves adjustable with respect to said casing, two associated with each of said casing inlet and exhaust ports, means for adjusting said slide valves to adjust the proportion of each cycle of operation of said rotor that said air inlet and exhaust passageways are provided, and indicating means associated with the four adjusting means and so calibrated that the sum of the readings of the two associated with the air inlet passageway indicate the period of air inlet and the sum of the readings of the two associated with the air exhaust passageway indicate the period of air exhaust.

15. A rotary air valve including a casing having an air inlet opening and an air exhaust opening, a rotor arranged to rotate therein, said rotor having a radial partition dividing it into air inlet and air outlet control portions, air control ports in the rotor wall, one on each side of said partition and spaced substantially 180 degrees apart, said casing having a main air passage conduit communicating with the interior of said casing by spaced inlet and exhaust ports each adapted to register with one of said air control casing ports during a period when said rotor rotates, an air inlet opening in said rotor on one side of said partition and an air exhaust opening leading from the interior of said rotor on the other side of said partition, whereby as said rotor is rotated air inlet and exhaust passageways will be successively provided from said casing air inlet opening through said rotor to said main air passage conduit and from the latter through said rotor to said casing air exhaust opening, slide valves adjustable with respect to said casing, at least one associated with each of said casing inlet and exhaust ports, and means for adjusting said slide valves to adjust the proportion of each cycle of operation of said rotor that said air inlet and exhaust passageways are provided.

16. A rotary air valve including a casing having an air inlet opening and an air outlet opening with a main conduit intermediate the ends of the casing for connection to an air chamber, a rotor within said casing and arranged to rotate therein, said rotor having spaced inlet and exhaust ports and inlet and exhaust openings, means providing air inlet and exhaust ports in said casing communicating with said main conduit and adapted to communicate periodically with the rotor inlet and exhaust ports respectively during rotation thereof, said rotor having a partition separating said inlet and exhaust ports, means for rotating said rotor, and means for adjusting the periods during each cycle of rotation of the valve that an air inlet passageway is completed from the housing air inlet opening through the rotor inlet port and casing inlet port to said main conduit and that an air discharge passageway is completed from the main conduit through the rotor and casing exhaust ports and to the casing exhaust opening.

17. A rotary air valve including a casing having an air inlet opening and an air outlet opening with the main conduit intermediate the ends of the casing for connection to an air chamber, a rotor within said casing and arranged to rotate therein, said rotor having spaced inlet and exhaust ports and inlet and exhaust openings, means providing air inlet and exhaust ports in said casing communicating with said main conduit and adapted to communicate periodically with the rotor inlet and exhaust ports respectively during rotation thereof, said rotor having a partition separating said inlet and exhaust ports, means for rotating said rotor, and slide valve means adjustable relative to said casing for adjusting the periods during each cycle of rotation of the valve that an air inlet passageway is completed from the housing air inlet opening through the rotor inlet port and casing inlet port to said main conduit and that an air discharge passageway is completed from the main conduit through the rotor and casing exhaust ports and to the casing exhaust opening.

18. A valve of the class described comprising the combination with a casing having inlet and exhaust openings and intermediate inlet and exhaust ports leading to and from a main conduit, respectively, of a rotor mounted for continuous rotation in said casing, means comprising ports in said rotor for directing air from the inlet opening of said casing through the intermediate inlet port into said main conduit and from the latter through the intermediate exhaust port to the exhaust opening of said casing, and a plurality of arcuate plates shiftable with respect to said casing to adjust the effective sizes of said intermediate ports.

ORVAL R. STRAWN.